UNITED STATES PATENT OFFICE.

CHARLES P. TATRO AND GEORGE DELIUS, OF SEATTLE, WASHINGTON, ASSIGNORS OF ONE-THIRD TO BENJAMIN R. BRIERLY, OF SEATTLE, WASHINGTON.

PROCESS OF REMOVING TIN FROM IRON.

1,316,926. Specification of Letters Patent. Patented Sept. 23, 1919.

No Drawing. Application filed October 11, 1918. Serial No. 257,703.

*To all whom it may concern:*

Be it known that we, CHARLES P. TATRO and GEORGE DELIUS, citizens of the United States, residing at Seattle, in the county of King and State of Washington, have invented certain new and useful Improvements in Processes for Removing Tin from Iron, of which the following is a specification.

This invention relates to processes for removing tin from iron, and its object is to utilize certain cheap and easily procurable chemical elements for dissolving the tin, and certain properties of electro-chemistry for recovering the tin from the solution, whereby the process may be made continuous and economical.

Our invention consists in certain steps involving chemical and electrical elements and the mode of operation constituting the process for removing tin from iron, hereinafter more fully described, and particularly stated in the claims.

The first step in this process is to provide a tank, preferably of iron lined with material which is electro-negative to tin, preferably carbon in the form of graphite slabs, separated from the iron by insulating material. Secondly, in this tank make a bath comprising a strong aqueous solution of caustic soda or potash. Thirdly, introduce a quantity of scrap tin—which is usually sheet iron plated with tin—into the bath, the tin resting against the carbon bottom and sides of the tank, and apply a mild degree of heat thereto, say 120° to 150° Fahrenheit. The alkaline caustic would very slowly dissolve the tin, but aided by galvanic action that is set up by the positive tin and iron in contact with the carbon lining of the tank as a negative in the solution, the action of dissolving the tin from the iron is greatly accelerated, leaving the tin in solution and the iron clean. In like manner, another and another batch of scrap tin may be introduced in the same bath, and its iron denuded and removed for future uses, until the bath becomes heavily loaded with tin in solution.

Now we transfer this tin solution into another tank made of iron and connect it with the negative pole of a source of electricity, and introduce batches of tin scrap secured in loose bales by wires or bands of iron and penetrated by long iron needles which we connect with the positive pole of the source of electricity, thus making the bale of tin scrap the anode, and the iron tank the cathode through which we pass a current such as is used in electroplating. By this arrangement, not only the tin of the bale is dissolved and precipitated, but with it, a portion of the tin in solution is precipitated, in flocculent form, toward the iron bottom and sides of the tank. The flakes are pure tin, and yet they are so loose and sponge-like that portions of them are floated by hydrogen gas imprisoned in their cells. This spongy mass may be screened or scooped out of the bath in any usual manner, and be melted into ingots or bars of tin for future use.

The detinned iron being removed leaves the bath caustically as strong as ever, and the process described may be continued indefinitely in the second tank by occasionally replenishing its loss from evaporation and water clinging to the iron removed, by keeping in the first tank a stock of tin in solution to be drawn upon when required. To keep the bath up to its full standard of efficiency, it should be frequently tested for acidity which may result from a slow gathering of carbonic acid from the air. When acid is detected it may be neutralized by introducing an aqueous solution of caustic lime; which should be done to prevent the iron from being attacked and oxidized by the acid, because such oxidation not only retards the chemical action described, but rapidly consumes such thin iron, and renders it unfit for many of its legitimate uses. This process of removing tin from iron is rapid, efficient and inexpensive.

We claim:

1. In a process for removing tin from iron, subjecting tin scrap directly in contact with carbon to the action of an alkaline bath.

2. In a process of removing tin from iron, subjecting the tin scrap in contact with a material which is electro-negative to the tin, to the action of an alkaline bath.

In testimony whereof we affix our signatures in the presence of two witnesses.

CHARLES P. TATRO.
GEORGE DELIUS.

Witnesses:
E. BANKSON,
E. A. HARTLEY.